(12) United States Patent
Beier et al.

(10) Patent No.: US 7,085,787 B2
(45) Date of Patent: Aug. 1, 2006

(54) CAPTURING DATA CHANGES UTILIZING DATA-SPACE TRACKING

(75) Inventors: Harley A. Beier, San Martin, CA (US); Vern L. Watts, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 10/197,810

(22) Filed: Jul. 19, 2002

(65) Prior Publication Data

US 2004/0015468 A1 Jan. 22, 2004

(51) Int. Cl.
*G06F 17/30* (2006.01)

(52) U.S. Cl. .................. 707/204; 707/200; 707/202
(58) Field of Classification Search ............ 707/202, 707/203, 204, 200
See application file for complete search history.

(56) References Cited

U.S. PATENT DOCUMENTS

| | | | |
|---|---|---|---|
| 4,385,352 A | 5/1983 | Bienvenu | |
| 4,408,273 A | 10/1983 | Plow | |
| 4,507,751 A | 3/1985 | Gawlick et al. | |
| 4,638,426 A | 1/1987 | Chang et al. | |
| 5,134,696 A | 7/1992 | Brown et al. | |
| 5,247,647 A | 9/1993 | Brown et al. | |
| 5,303,367 A | 4/1994 | Leenstra, Sr. et al. | |
| 5,379,412 A | 1/1995 | Eastridge et al. | |
| 5,561,798 A | 10/1996 | Haderle et al. | |
| 5,581,750 A | 12/1996 | Haderle et al. | |
| 5,721,915 A | 2/1998 | Sockut et al. | |
| 5,881,379 A * | 3/1999 | Beier et al. .............. | 707/101 |
| 5,933,820 A * | 8/1999 | Beier et al. .............. | 707/1 |
| 6,016,501 A | 1/2000 | Martin et al. | |
| 6,023,707 A * | 2/2000 | Hamada et al. ........... | 707/202 |
| 6,026,412 A | 2/2000 | Sockut et al. | |
| 6,029,178 A | 2/2000 | Martin et al. | |
| 6,035,307 A | 3/2000 | Martin et al. | |
| 6,070,164 A | 5/2000 | Vagnozzi | |

(Continued)

FOREIGN PATENT DOCUMENTS

JP 1023351 1/1989

OTHER PUBLICATIONS

Agrawal et al. Intergrating Vertical and Horizontal Partition into Automatied Physical Database Design, Proceeding of the 2004 ACM SIGMO, 2004, page from 359-370.*

(Continued)

*Primary Examiner*—Jean M. Corrielus
*Assistant Examiner*—Baoquoc N. To
(74) *Attorney, Agent, or Firm*—Sughrue Mion, PLLC

(57) ABSTRACT

An on-line reorganization facility (ORF) uses index data-spaces that point to other data-spaces, referred to as data data-spaces, to efficiently track and coordinate information about the data-elements in an original data-space operated upon by a reorganization process. A relative base address of a data-element in an index data-space can be derived from a relative base address of a data-element in an original data-space, and vice versa. An index data-space data-element contains a location of a data-element in a data data-space that tracks change information related to a corresponding data-element in the original data-space. Tracked changes are later applied to the newly reorganized data-space to assure consistency and integrity of the data. Tracked changes include the location in the original data-space where the change occurred and a flag indicting the type of change.

14 Claims, 4 Drawing Sheets

U.S. PATENT DOCUMENTS

| | | | |
|---|---|---|---|
| 6,070,170 A * | 5/2000 | Friske et al. | 707/202 |
| 6,073,221 A | 6/2000 | Beal et al. | |
| 6,092,086 A | 7/2000 | Martin et al. | |
| 6,122,639 A | 9/2000 | Babu et al. | |
| 6,226,646 B1 | 5/2001 | Geurts | |
| 6,292,795 B1 | 9/2001 | Peters et al. | |
| 6,324,654 B1 | 11/2001 | Wahl et al. | |
| 6,463,501 B1 | 10/2002 | Kern et al. | |
| 6,519,613 B1 * | 2/2003 | Friske et al. | 707/202 |
| 6,535,893 B1 * | 3/2003 | Friske et al. | 707/204 |
| 6,609,813 B1 | 8/2003 | Showers et al. | |
| 6,745,210 B1 * | 6/2004 | Scanlan et al. | 707/204 |
| 6,879,986 B1 * | 4/2005 | Fisher | 707/101 |
| 2001/0047360 A1 | 11/2001 | Huras et al. | |
| 2002/0147736 A1 * | 10/2002 | Isip, Jr. | 707/200 |

OTHER PUBLICATIONS

Maryanski J. Fred An Architecture for Fault Tolerance in Database Systems, ACM/CSC-ER, proceeding of the ACM 1980 annual, 1980, pp. 389-398.*

Severance et al. Differential Files: Their application to the Maintenance of Large Databases, ACM Transactions on Database System, 1976, pp. 256-267.*

Batory S. D. Optimal File Designs and Reorganization Points, ACM Transaction on Database System, 1982, pp. 60-81.*

March T. Salvatore. On the Selection of Efficient Record Segmentations and Backup Strategies for Large Shared Databases, ACM Transaction on Database system, 1984 409-438.*

Jacobs, et al, Table Activity/Reorg Indicator for the OS/2 EE Database Manager, IBM Technical Disclosure Bulletin, vol. 34, No. 10A, Mar. 1992, pp. 163-164.

Li, et al, Reorganization Flags for Table Indexes, IBM Technical Disclosure Bulletin, vol. 35, No. 5, Oct. 1992, pp. 156-157.

Ballard, et al, Improved Recovery from Partial Page Writes of Data Pages, IBM Technical Disclosure Bulletin, vol. 36, No. 5, May 1993, pp. 141-143.

IBM Technical Disclosure Bulletin, Hileman, R.K., Space Reclamation Via an Indexed Structure, vol. 14, No. 4, Sep. 1971, pp. 1214-1217.

IBM Technical Disclosure Bulletin, Schlumpberger, J.A., DL/1 Subset File Organization and Access Technique, vol. 22, No. 10, Mar. 1980, pp. 4702-4708.

Rui Ding et al., "A quadtree based dynamic attribute index structure and query process," Proceeding 2001 International Conference on Computer Networks and Mobile Computing, IEEE Computer Society, Oct. 16, 2001, Abstract.

* cited by examiner

CAPTURING DATA CHANGES UTILIZING DATA-SPACE TRACKING

CROSS REFERENCE TO RELATED APPLICATIONS

This application is related to a co-pending and commonly assigned patent application entitled, "Data-Space Tracking with Index Data-Spaces and Data Data-Spaces," Ser. No. 10/198,151 filed concurrently herewith and incorporated by reference within this application in its entirety.

BACKGROUND OF THE INVENTION

1. Field of the Invention

The invention relates to database management systems (DBMS). More particularly, it relates to improved methods and techniques for efficiently associating temporary information with data-elements in a memory data-space, and the use of those methods and techniques for improving the efficiency and reducing the complexity of on-line database administration utilities.

2. Description of the Related Art

Database administration utilities that use conventional methods and techniques typically require that databases be taken off-line in order to perform certain administrative tasks, such as reorganizing the database. For database systems that use relatively small data stores, taking the database off-line to perform administrative tasks does not raise significant operational issues, because the amount of off-line time required to perform the required administrative task is generally acceptable as it introduces only minimal disruption to operations. However, as the volume of data associated with a database increases, so does the time required to perform administrative tasks upon the database. For example, depending upon the nature of the administrative task to be performed, the time required to execute the administrative task can increase exponentially with the size of the database.

As would be expected, the longer the period of unavailability the greater the likelihood that adverse operational impacts will arise. Furthermore, as customer demands for databases with greater capacity and 24×7 availability increase, system administrators typically find it more and more difficult to schedule much needed maintenance and optimization routines. As a result, many administrative routines are not performed as often as they should to optimize system performance and/or to minimize loss of data in case of system failure resulting, ultimately, in reduced performance and increased operational risk.

Issues associated with database availability can be alleviated by allowing databases to remain on-line while administrative tasks are performed. However, using conventional techniques, allowing a database to remain on-line while performing certain administrative operations can greatly increase the complexity of the administrative utility needed to execute the operation. Such complexity can increase the time required to execute the administrative operation, increase system load, degrade system capacity and performance, and result in unacceptable operational conditions. In a poorly maintained and/or already over-loaded system, such increased load can, in the worst case, result in unrecoverable catastrophic system failure.

Allowing a database to remain on-line while performing an administrative task is being performed typically implies that multiple processes will simultaneously access the data tables and records maintained by the database. Depending upon the administrative operations to be performed, conflicting conditions can arise. For example, if the administrative operation involves copying records from one database table to a second database table, a change must be applied to both database tables if the change imposed by a concurrent process affects a data-element that has already been copied to the second database table. If such conflicts are resolved by locking large segments of the database for extended periods of time, many of the advantages of allowing simultaneous on-line access are negated. If, on the other hand, locks are not strictly imposed, conflicting versions of a database table can arise that must be tracked and later resolved.

Conventional approaches are not capable of efficiently tracking and coordinating the large amount of detailed information that must be maintained to resolve the data integrity and consistency issues that arise during the execution of an on-line reorganization tool. For example, conventional reorganization techniques typically synchronize data across database tables using log files containing a record of the changes made in one or more data tables. Such log-based approaches are relatively slow because they require searching a log file for records relevant to an affected data table, retrieving the relevant records from the log, identifying records in the affected data table that corresponds to the log request (possibly requiring a second search of the copied/reorganized data table), and appropriately applying the logged change. Furthermore, such conventional techniques typically use concatenated strings within the log file to act as unique keys. These keys are used to locate the corresponding records within the related data table, and a change recorded within the log file is then applied. Such concatenated keys are an inefficient mechanism for locating records within a database table. In addition, log files typically contain the actual changed data values, thereby increasing the size of the log file and increasing the amount of information that must be parsed. Furthermore, such log based techniques are sequential in nature, meaning that if five updates are performed against a record in one data table, all five updates are again performed upon the related record in the related data table, even though only the last update is needed to synchronize the two data tables.

Conventional approaches for resolving the discrepancies that arise during the execution of on-line database administrative operations, are I/O intensive, inefficient, time consuming and are not practical for large database systems that require high availability of database tables, and highly optimized performance. A new approach is needed for efficiently tracking and coordinating large amounts of detailed information related to the on-line execution of database administrative operation.

SUMMARY OF THE INVENTION

Therefore, in light of the above, and for other reasons that will become apparent when the invention is fully described, apparatuses, articles of manufacture and methods for reorganizing information in a computer system by using data-spaces to manipulate and track information related to a database reorganization using separately addressable memory data-elements. Separate data-spaces are used to store the original data (i.e., an original data-space), receive reorganized copies of data-elements of the original data-space (i.e., a shadow data-space), and to record and track information relative to individual data-elements undergoing reorganization (i.e., a data data-space and an index data-space, respectively).

A data-element in the data data-space stores the original location of an original data-space data-element, the new location of a corresponding data-element in the shadow data-space, and status information that records whether the data-element in the original data-space has been updated or deleted, after the original data-element has been copied to the reorganized data-space and whether any new original data-elements have been added that must be added to the shadow data-space.

Status information in the data data-space is maintained by intercepting log status reports and updating the associated data data-elements to record the changes performed. Data-elements in the data data-space are not required to store the new or modified data, but rather the nature of the change that occurred (i.e., new, update, and delete) is stored. Thus, significant storage space efficiencies are achieved.

Data consistency between data-elements in the original data-space and data-elements in the shadow data-space is achieved by applying recorded changes stored in the data data-space to the related shadowed data-elements. Because the data data-space records the location where changes occurred, the net effect of multiple changes to a data-element in the original data-space can be applied to its associated data-element in the shadow data-space with only a single change. Thus, significant processing efficiencies are achieved in maintaining data consistency across the data-spaces.

Features and advantages of the invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

DETAILED DESCRIPTION

Figure 1:
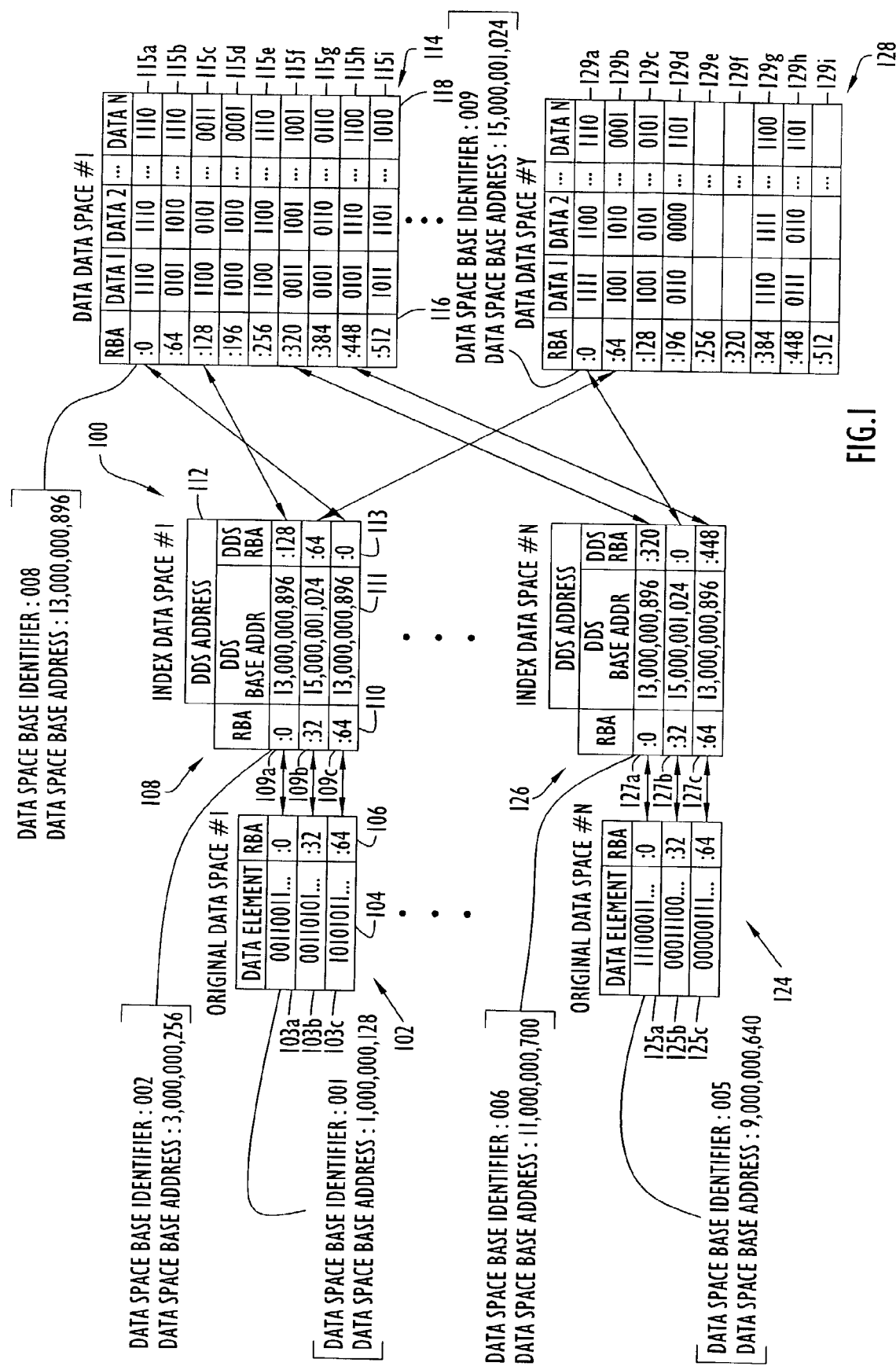
FIG. 1 is a representative embodiment of index data-spaces and data data-spaces that are used to associate information with data-elements in an original data-space.

The embodiments described below are described with reference to the above drawings, in which like reference numerals designate like components.

Data-spaces are blocks of addressable memory space in a computer readable memory that can hold data, but are not allowed to execute program code. The resources used to access and manipulate data-spaces include a data-space base address that identifies the beginning of the data-space in memory. The location of a data-element within a data-space is determined relative to a data-space base address using a relative base offset address (RBA). An RBA can be represented, for example, as a number of bytes or bits from the data-space base address to the first byte, or bit, of a data-element. The location of a data-element anywhere within a group of data-spaces is identified with a data-space base address/RBA combination, wherein the RBA is an offset from its associated data-space base address. Since data-elements are stored in a data-space in sequential order, a sequence order number (e.g., 0, 1, 2, . . . , N) can be used to specify a relative offset, in data-elements, from the data-space base address. By multiplying the sequence order number associated with a data-element, by the bit/byte length of the data-elements stored in the data-space, a relative base offset address for the data-element in bits/bytes is derived. This computation is simplified when fixed-length data-elements are used in the data-spaces.

The size of data-spaces and data-elements within data-spaces are defined to meet the needs of a specific application, restricted only by the physical memory resources of the operating environment. In an IBM DB2® environment, for example, data-spaces are defined within buffer pools defined in a separate area of memory and are limited to 2 Gigabytes (GB) of memory space. However, multiple data-spaces may be allocated and managed by an application requiring more than 2 GB of data-space storage. Furthermore, database environments are expected to continue to support increasingly larger data-spaces.

Methods and apparatuses are described here that use index data-spaces that point to other data-spaces referred to as data data-spaces to efficiently track and coordinate information associated with data-elements in a data-space. The ability to efficiently store and retrieve large amounts of information related to individual data-elements of a data-space has many useful applications in a database environment. In the case of an on-line reorganization facility (ORF), such methods and techniques are used to allow databases, that would conventionally be taken off-line prior to the execution of certain administrative functions, to remain on-line and accessible during the execution of the same administrative processes. Indexing data-spaces and data data-spaces are used to efficiently track and coordinate information related to the administrative process at the data-element level as well as to track concurrent changes affecting multiple temporary data-spaces used by the administrative process. This information is used to assure that the integrity and consistency of all data-spaces affected by the administrative process are maintained.

FIG. 1 depicts a set of data structures including original data-spaces, e.g., a first original data-space 102 to an $n^{th}$ original data-space 124; index data-spaces, e.g., a first index data-space 108 to an nth index data-space 126; and data data-spaces, e.g., a first data data-space 114 to an $y^{th}$ data data-space 128. The first index data-space 108 includes representative data-elements 109a–c, and the $n^{th}$ index data-space 126 includes representative data-elements 127a–c that are used to associate information contained within one or more of data data-elements 115a–i of the first data data-space 114 and one or more of data data-elements 129a–i of the $n^{th}$ data data-space 128 with data-elements 103a–c of the first original data-space 102 and with data-elements 125a–c of the $n^{th}$ original data-space 124. Using the techniques depicted in FIG. 1, any amount of information can be associated with an original data-space 102 or original data-space 124 (i.e. 102/124) at the data-element level 103a–c/125a–c in order to facilitate the execution of administrative functions or to manipulate data-space data-elements for any other intended purpose.

The RBA of related data-elements within the original 102/124 and index data-spaces 108/126 is determined based upon the RBA (e.g., 106/110) of one of the related data-elements from either data-space and the fixed data-element size used by each of the respective data-spaces. This novel approach allows indirect addressing, to information contained in one or more data data-spaces, to be applied to any original data-space, without any enhancement or modification to the content of the original data-space.

As shown in FIG. 1, using the RBA based addressing scheme described above, there is a one-to-one relationship between original data-elements 103a–c/125a–c in an original data-space 102/124 and index data-elements 109a–c/127a–c in the index data-spaces 108/126. Although such an approach may appear repetitive, in fact, it is very efficient in that each index data-element 109a–c/127a–c in an index data-space 108/126 need contain only sufficient storage to record the address 112 of a single data data-space data-element, as described above. Depending upon the nature of the application using the described methods and techniques, there is no need for a direct one-to-one relationship between index data-elements 109a–c/127a–c in an index data-space 108/126 and data data-elements 115a–i/129a–i in a related data data-space 114/128. Still further, the length of data data-space 114/128 data-elements 115a–i/129a–i can be tailored to the length necessary to support an application's requirements. Therefore, very efficient use of memory space is achieved while full flexibility and versatility is retained. Given that an index data-element 109a–c/127a–c within an index data-space 108/126 contains both a data-space base address 111 and an RBA 113 for a data-element 115a–i/129a–i in a data data-space 114/128, data data-spaces need be allocated only as needed. Data-elements in a single index data-space can directly access data-elements in multiple data data-spaces, and accordingly, such data-space data-elements may be organized in any order, random or otherwise.

Data-space memory storage requirements associated with the described methods and techniques are optimized to meet the needs of a specific application and operating environment by selecting the original data-space data-element size, data data-space address length, and/or data data-space data-element size. For example, if an application requires that information be stored for each group of thirty-two bytes in an original data-space, the application accesses the original data-space addressable memory space in thirty-two bytes increments, thereby establishing the data-element size within the original data-space as 32-bytes. Although a data-element size of 32-bytes is used here as an example, the data-element size can be selected to be any convenient size. Given that the original data-space is of a fixed size, increasing the data-element size reduces the number of data-elements in the data-space and hence reduces the number of data-elements in the corresponding index data-space. Given that the index data-space data-element has a fixed size, based upon the length of an address for a data data-space data-element, decreasing the number of index data-space data-elements reduces the overhead space required to support the index data-space. Therefore, the original data-space data-element size is selected as large as possible within constraints imposed, directly or indirectly, by application specific requirements.

To further optimize system overhead requirements to meet the needs of a specific application, the number of bytes maintained for each original data-space data-element in the data data-space also can be selectively configured. For example, for one purpose, it may be necessary to store an additional 32 bytes of information for every 4-byte data-element in an original data-space. For another purpose, it may be necessary to store only 16 bytes of information for every 4-byte data-element in an original data-space. The data data-element size in the data data-space can be selected to accommodate those different purposes.

Figure 2:
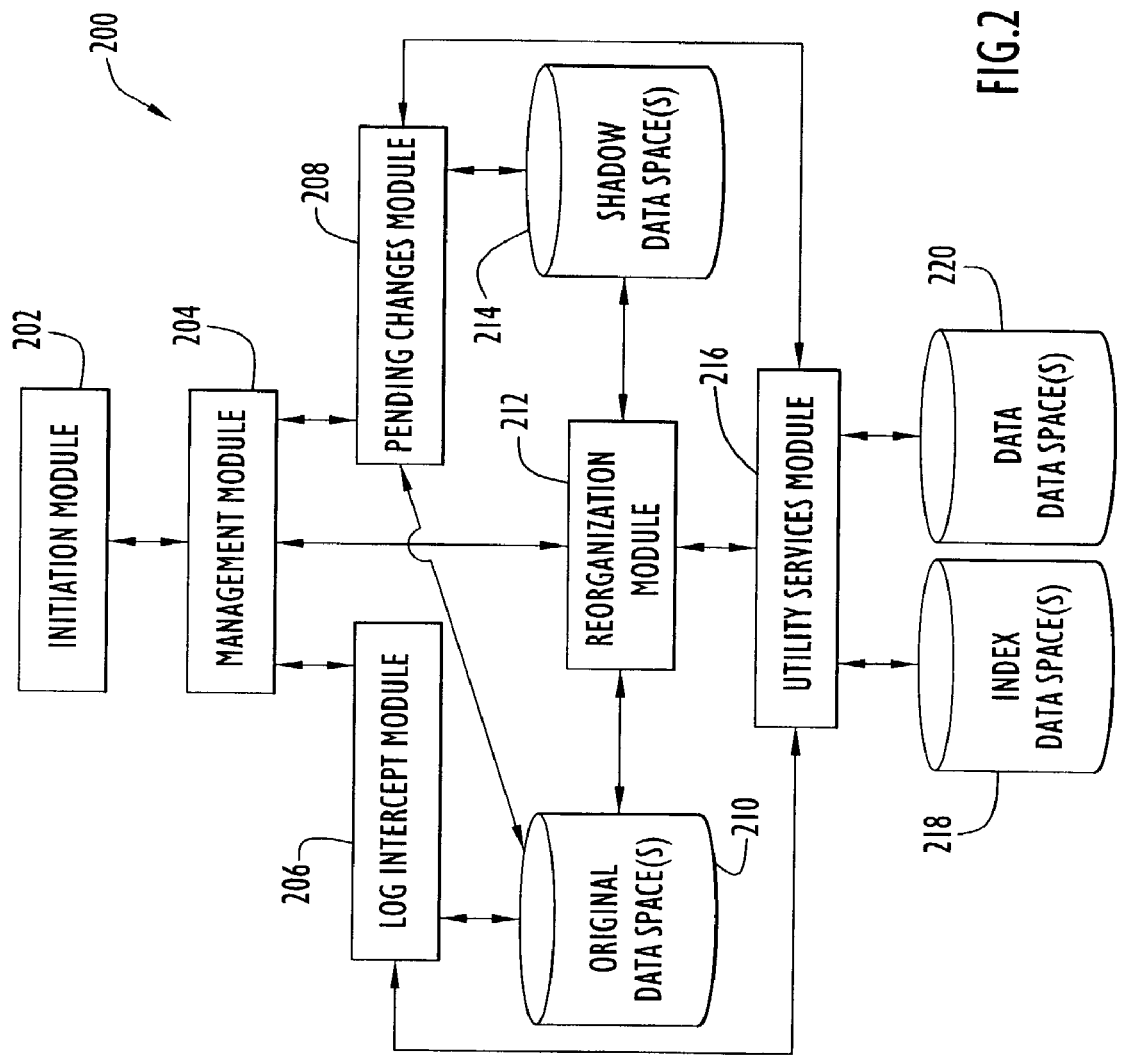
FIG. 2 is a block diagram of an on-line database reorganization tool that uses data-space tracking with index data-spaces to maintain data integrity.

The index data-spaces and data data-spaces shown in FIG. 1 can have many uses. One such use is to track changes in a database while the database is being reorganized. FIG. 2 presents a non-limiting representative block diagram of such an on-line administrative utility used to reorganize a database, or a designated portion thereof, such as a database table or other database system resource. The on-line reorganization facility (ORF) 200 presented in FIG. 2, uses index data-spaces and data data-spaces to efficiently track and coordinate information about data-space data-elements during the reorganization process. This information is used to assure the integrity and consistency of all affected data-spaces, and hence, the integrity and consistency of the database undergoing reorganization.

In brief, FIG. 2 includes six ORF modules and four groups of data-spaces to implement a non-limiting representative embodiment of an on-line reorganization facility 200. An initialization module 202 receives a request to reorganize a database or portion of an identified database (e.g., a table, system space, etc). In response, the initialization model 202 reserves sufficient system resources with which to execute the reorganization, which can include: initialization of sufficient data-spaces in which to store the database, or portion thereof, to be reorganized (i.e., the original data-space 210); initialization of data data-spaces 220 in which to track information related to the reorganization, as well as concurrent changes to the data undergoing reorganization; initialization of index data-spaces 218 that are used to relate information tracked in the data data-space to data-elements in the original data; and, initialization of shadow data-spaces 214 that are used to store data that is copied and reorganized from the original data-space. The sizes of original, index, data tracking, and shadow data-spaces allocated are based upon the size of the database to be reorganized. Multiple 2 GB data-spaces can be allocated and managed by the reorganization tool as a single data-space, if necessary to accommodate the needs of the database to be reorganized. This is accomplished by managing the data-space base addresses and/or by storing references to data-space base addresses, either directly or indirectly, in relation to stored data-element RBA addresses. In addition, the initialization model 202 initiates an instance of an on-line reorganization facility (ORF) management module 204 that coordinates the actions of the remaining ORF modules throughout the reorganization process.

A reorganization module 212 copies data-elements from the original data-space 210 to a reorganized shadow copy 214 of the original data-space. Data-elements within the shadow data-space are reorganized in accordance with logic internal to the reorganization module 212. The reorganization module 212 also coordinates with a utility services module 216 to track and store, within a series of index data-spaces 218 and data data-spaces 220, the source and destination addresses of data-elements copied from the original data-space 210 to the reorganized shadow data-space 214.

A log intercept module 206 intercepts log requests and coordinates with the utility services module 216 to track changes to data-elements in the original data-space 210 that have already been copied to the shadow data-space 214. These tracked changes are stored as updates to data-elements created within data data-spaces 220 by the reorganization module 212, as described above.

A pending changes module 208 applies tracked changes retrieved from the data data-space 220, via the utility services module 216, to the shadow data-space 214, thereby assuring consistency between data contained in the original data-space 210 and data contained in the shadow data-space 214. Once all pending changes are applied to the reorganized shadow data-space 214, the original data-space 210 is deactivated and the reorganized shadow data-space 214 is activated to replace the original data-space 210.

The ORF modules described, above, work together to efficiently and effectively reorganize an on-line data-space, with minimal overhead and operational load. The methods and techniques described in relation to FIG. 1 can be used to efficiently track information associated with execution of a wide variety of database administrative operations, such as an on-line database image copy facility. The reorganization module 212 can be replaced with any administrative module that is designed to use the methods and techniques described in relation to FIG. 1 to perform its administrative operation. Depending upon the application selected, the log intercept module 206, the pending changes module 208 and, possibly, the shadow data-space(s) 214 also can be removed and/or replaced with modules performing similar or different functions.

As an example of how the methods and techniques described here are used to efficiently and effectively reorganize an on-line data-space, with minimal overhead and operational load, the inter-relationships between ORF modules and the respective data-spaces are described in additional detail, below.

Figure 3:
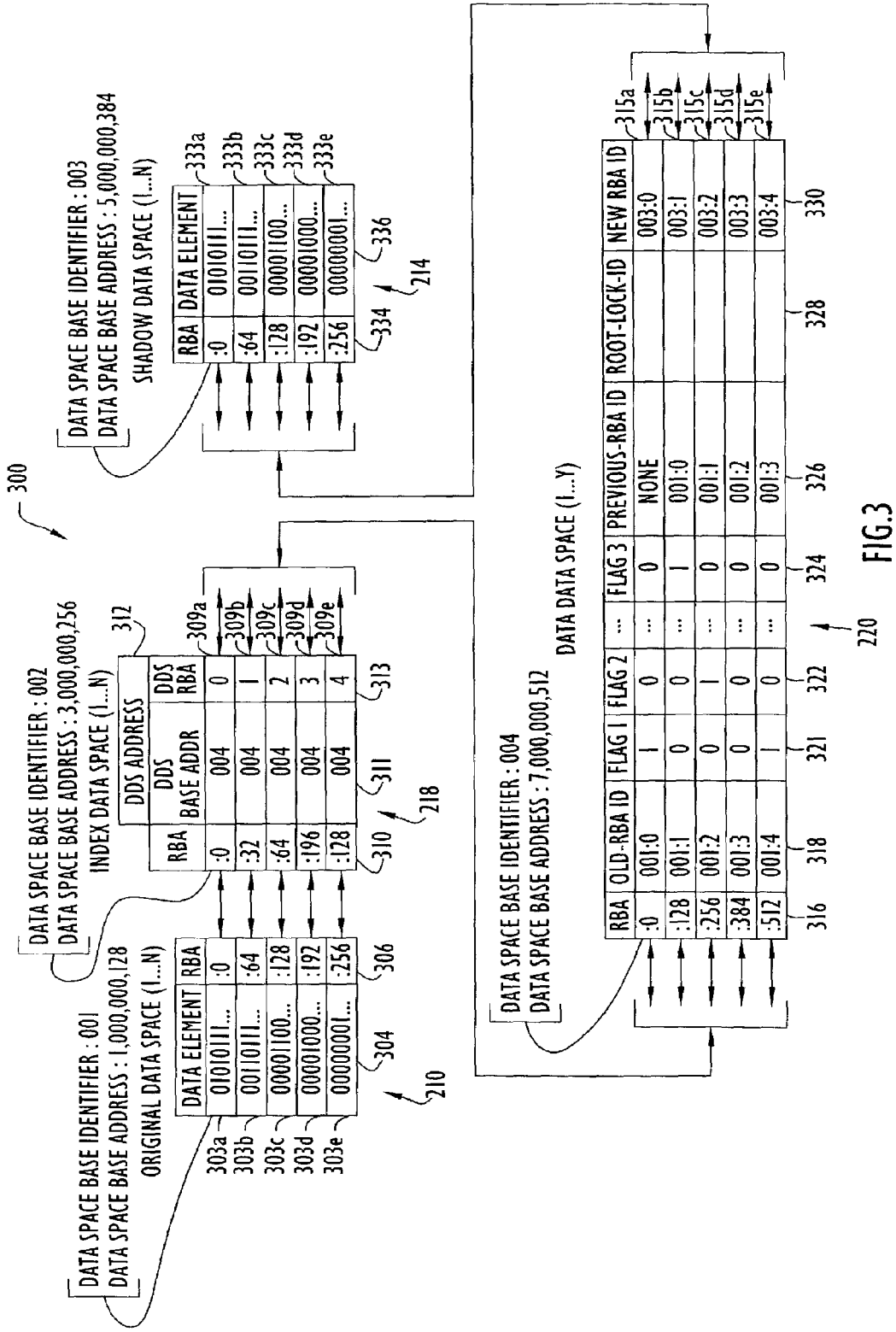
FIG. 3 is a representative embodiment of index data-spaces and data data-spaces used to track changes associated with copying an original data-space to a shadow data-space and reorganizing that data-space.

FIG. 3 depicts a non-limiting representation of the data-spaces, data-elements, and associated interrelationships used to implement an embodiment of an ORF as described above, in relation to FIG. 2. Four types of data-spaces are used in a non-limiting, representative ORF: the original data-space 210 with representative data-elements 303a–303e, the index data-space 218 with representative data-elements 309a–309e, the data data-space 220 with representative data-elements 315a–315e, and the shadow data-space 214 with representative data-elements 333a–333e.

All of the data-spaces include data-elements, each of which is identified with a relative base address (e.g., 306, 310, 334, and 316) that identifies the start of the data-element relative to the base address of the data-space. The content of data-elements within the original data-space 304 and the shadow data-space 336 is determined by the application programs and is independent of the processes that maintain the data. Although the relative position of data-elements within the shadow data-space may differ from the position of their associated data-elements in the original data-space, in order to optimize organizational efficiency, the content of those data-elements will not be altered.

The index data-elements 309a–e within the index data-space 218 provide an indirect addressing scheme between the original data-elements 303a–e in the original data-space 210 and the data data-elements 315a–e in the data data-space 220. The data data-space 220 serves as a storage area for information necessary for reliably executing an administrative process upon the original data-space 210. Although FIG. 2 and FIG. 3 depict an on-line data-space reorganization tool, the indirect addressing methods and techniques described here are applicable to any operation for which it is useful to associate additional information with data-elements within a data-space, such as creating an accurate image copy of an on-line database.

Referring again to FIG. 3, original data-elements 303a–e within the original data-space 210 are related in a one-to-one correspondence with index data-elements 309a–e within the index data-space 218 based upon the RBA of the original data-elements 303a–e within the original data-space 210. If the bit-length of data-elements within both the original data-space 210 and index data-space 218 are the same, related data-elements 303a–e/309a–e within each data-space will share the same RBA relative to their respective data-space base addresses. However, if the data-element lengths differ, a translation function is used to determine the RBA of an index data-element 309a–e from the RBA of an original data-element 303a–e, and vice versa. For example, to determine the RBA of an index data-element 309a–e (wherein the index data-elements are four bytes in length) from the RBA of a original data-element 303a–e (wherein the original data-elements are six bytes in length), the RBA of a original data-space 210 data-element 303a–e is divided by six and multiplied by four. Likewise, to determine the RBA of an original data-element 303a–e (wherein the original data-elements are six bytes in length) from the RBA of an index data-element 309a–e (wherein the index data-elements are four bytes in length), the RBA of the index data-space 218 data-element 309a–e is divided by four and multiplied by six. It will be understood that the example lengths of four and six bytes for the index and original data-elements, respectively, are merely examples and any other bit lengths can be used that are suitable for the operational environment.

In an alternative embodiment, a sequence order number (e.g., 0, 1, . . . N) can be associated with the data-elements of one or more of the respective data-spaces that indicates the position of the data-element within the sequence of data-elements within its respective data-space. Since corresponding data-elements within an original data-space 210 and an index data-space 218 share the same sequence order number, when translating from an index data-space RBA to an original data-space RBA (and vice versa) it is not necessary to divide by the length of the data-element.

In another embodiment, sequence order numbers for data-elements in the respective data-spaces manipulated by an application are stored within data-elements 309a–e/ 315a–e of the index data-space 218 and/or data data-space 220 to facilitate translation between data-spaces. It should be noted that although "RBA" is depicted in FIG. 3 as a data-element component (e.g., at 306, 310, 316, 334), RBA's are actually the offset addresses of the data-elements (i.e., 303a–e, 309a–e, 315a–e, 333a–e, respectively) themselves and do not require storage within the respective data-space data-elements.

As shown in FIG. 3, a data-element 309a–e in an index data-space 218 is identified with an RBA 310 (relative to its own data-space base address). The data-element 309a–e includes a data data-space address 312 for a data-element 315a–e in a data data-space 220 that includes a data data-space base address 311 which can be a data-space identifier that can be resolved by the system into a physical address for the designated data-space (alternatively, the data data-space base address can be an actual address as illustrated in FIG. 1), and a data data-space RBA 313. Depending upon the number of data-spaces and data-elements within each data-space to be addressed, the number of bits in an index data-space 218 data-element 309a–e can be optimized to meet the needs of each specific application. In an index data-element 309a–e of length four bytes (i.e., 32-bits), for example, 6-bits are used to record a data data-space base address identifier 311 and 26-bits are used to record a data data-space RBA element number 313. In such a system, an index data-space 218 with data-elements 309a–e that are four bytes long can indirectly address 64 data data-spaces, each containing 67,108,864 data-elements. The ability to identify the RBA of such a large number of data-elements is achieved by storing the sequential RBA element numbers (e.g., sequence order numbers 0, 1, 2, 3, . . . , 67,108,864) rather than the actual RBA Offset values, thus maximizing the number of RBA's that can be identified using 26 bits (i.e., $2^{26}$). As previously described, an application implementing the methods and techniques described here, is able to resolve an RBA element number to a full RBA offset value for a specific data-space by multiplying the element number by the data-element size used by the data-space. As previously described, the size of index data-space elements, and hence the number of data data-spaces and data data-elements that can be addressed, is determined as a design consideration based upon application requirements and technical limitations of the operational environment in which the application will be used, and is not limited by the methods and techniques described here.

A data data-element 315a–e in a data data-space 220 can be of any length (limited only by the constraints of the operational environment) and can contain any information that an application has been designed to associate with its associated original data-element 303a–e in the original data-space 210. As shown in FIG. 3, in the case of a non-limiting representative embodiment of a data data-space 220 associated with an ORF, a data data-element 315a–e includes: the data-space identifier and RBA identifier of its related original data-element in the original data-space (i.e., the "old_RBA_ID" 318); one or more flags (321 through 324) to indicate the nature of any changes to the corresponding original data-element 303a–e in the original data-space 210; the data-space identifier and RBA identifier of the previous original data-element (i.e., the "Previous_RBA_ID" 326) in the original data-space 210; a root lock identifier 328; and, the data-space identifier and RBA identifier of its related shadow data-element 333a–e in the shadow data-space 214 (i.e., the "new_RBA_ID" 330). With respect to the status flags 321–224 used to indicate changes in the corresponding original data-element in the original data-space, in one non-limiting, representative embodiment, flag1 321 is set to '1' if an update has occurred; flag2 322 is set to '1' if a data-element has been added to the original data-space; and, flag3 324 is set to '1' if the corresponding data-element in the original data-space has been deleted. An example of a root lock identifier is an index key (such as an employee serial number) that can be used to access and/or lock specific records within a portion of the database actively undergoing reorganization. Use of the root lock allows a database undergoing reorganization to remain effectively on-line during the reorganization process, by allowing those portions actively in use by the ORF to be temporarily locked.

With respect to the ORF modules described in relation to FIG. 2, each time the reorganization module 212 copies an original data-element 303a–e from the original data-space 210 to a shadow data-element 333a–e in the shadow data-space 214, the reorganization module communicates with the utility services module 216 to create a data data-element 315a–e in the data data-space 220 that includes the old_RBA_ID 318, change status flags 321–224, previous_RBA_ID 326, root_lock_ID 328, and new_RBA_ID 330, as described above. The utility service module 216 also creates an index data-element 309a–e in the index data-space 218 containing a data data-space base address identifier 311 and a data data-space RBA sequential data-element identifier 313 of the newly created data data-element 315a–e. An RBA sequential data-element identifier is preceded with a data-space base address identifier to provide the complete address of an element in a data-space. An administrative tool uses the data-space base address identifier to access application specific lookup tables to identify the full address of the identified data-space and to determine the length of a data-element associated with the data-space. The RBA sequential data-element identifier is then multiplied by the identified data-element length and appended to the full address of the data-space, to obtain the full address of the reference data-element.

Use of a data-space base address identifier coupled with a RBA sequential data-element identifier to provide the complete address of an element in a data-space is shown in FIG. 3 at old_RBA_ID 318, previous_RBA_ID 326, and new_RBA_ID 330. As shown in FIG. 3, old_RBA_ID 318 and previous_RBA_ID 326 both point to data-elements in the original data-space, which has a data-space base identifier of "001." This information identifying the previous original data-element can be used as another access point to the original data-space, if needed by the application. New_RBA_ID 330 points to data-elements in the shadow data-space, which has a data-space base identifier of "003." Use of data-space base address identifiers coupled with RBA sequential data-element identifiers, in FIG. 3 as described above, is contrasted in FIG. 1 at 111 and 113, in which a full data-space base address identifier and RBA address are used, respectively. While both techniques can be used, the use of identifiers can be a more efficient use of index data-space memory resources, as previously described.

Updates made to database records already processed by the ORF utility are captured and applied to the shadow data-space 214. This includes updates and newly inserted records earlier in the database than the present position of a ORF utility database cursor. The ORF log intercept module 206 intercepts log requests and compares the database name in the log request with the name of the database being reorganized to determine whether the current log request is a candidate for capture. If the names agree the database cursor is checked to see if the current update is for a record that has been processed by the utility (i.e., is the captured cursor < the current ORF reorganization module 212 cursor). If the affected record has already been copied to the shadow data-space, the change described within the log request is captured for later application to the shadow data-space 214.

Upon intercepting a log request that must be captured for later application to the shadow data-space 214, the log intercept module 206 uses the information within the intercepted log request to search the original data-space 210 to determine the RBA of the data-element(s) affected by the intercepted log request. The RBA value(s) identified are then conveyed to the utility services module 216. If the index data-space 218 indicates that a data data-element 315a–e exists in association with the RBA(s) identified, the flags 321–224 contained within the data data-element are set in accordance with the information contained within the intercepted log request, as described above. If the captured log request indicates newly added data, new data-elements 315a–e/309a–e are added to the data data-space 220 and index data-space 218 and correlated with the corresponding new data-elements 303a–e added to the original data-space 210. In addition, a pending change counter is incremented whenever a data-element is added and/or the first time that an existing data data-element 315a–e is updated to reflect a pending change. In this manner, the pending change counter is updated to reflect the number of data-elements in the shadow data-space 214 that are inconsistent with the original data-space 210.

This approach is efficient with respect to both storage resources and the processing required to track changes as they occur. The data data-elements 315a–e are used to indicate "where" (i.e., the data-space/RBA location) the update has occurred in the original data-space but not "what" has changed, thereby avoiding the need to duplicate change information already stored in the original data-element 303a–e. Furthermore, regardless of the number of times the same data-element in the original data-space is updated, the data data-space 220 requires only one data data-element 315a–e for a corresponding original data-element and does not require additional data data-elements for each change to the original data-element.

When applying pending changes to data-elements 333a–e within the shadow data-space 214, the indirect address and data data-space approach is equally efficient with respect to the processing steps required to apply a tracked change. Pending updates are easily identified based upon the flags within the data data-elements 315a–e, as discussed above. If the flags indicate an update, the contents of the data-element 303a–e located at "old_RBA_ID" are copied to the data-element 333a–e located at "new_RBA_ID." If the flags indicate a deletion, the shadow data-element 333a–e in shadow data-space 214 at new_RBA_ID is deleted. If the flags indicate an addition, a shadow data-element 333a–e in shadow data-space 214 is added, and the RBA of the added shadow data-element 333a–e in the shadow data-space 214 is stored in the previously created data data-element 315a–e at new_RBA_ID 330 and data is copied from the original data-element 303a–e to the newly created shadow data-element 333a–e.

Such an approach is extremely efficient in that, regardless of how many updates that may have occurred to a data-element in the original data-space prior to the final update, or final deletion, an administrative tool using the techniques described above needs only to apply a single update (i.e., the net end result of the numerous prior changes). A conventional log based tool, on the other hand would sequentially process each recorded update to the original data-space, finally arriving at the same result in the shadow data-space, after the execution of multiple updates, that the present techniques reach after only a single update.

In support of the majority of administrative utilities that are implemented using the data data-space and index data-space techniques addressed above, the data data-space and index data-space are preferably created using data-spaces in high speed volatile memory and are not committed to permanent, non-volatile memory. Index data-spaces and data data-spaces typically can be used to store intermediate information useful to the execution of an administrative application. The data retained in these structures typically would be discarded once the administrative activity is completed. Therefore, even greater speed and efficiency is achieved by maintaining index data-spaces and data data-spaces in non-persistent memory storage, rather than in persistent storage, such as on disk. Furthermore, by storing and retrieving such information in memory storage, access and retrieval times are greatly enhanced, thereby minimizing overhead load.

In the data-space reorganization approach described above, storing such information in memory does not introduce any significant operational risk, for if a system failure occurs, the shadow data-space, index data-space and data data-space may be discarded without losing operational data. The reorganization process can be reinitiated with no loss of data. However, in applications in which such loss of information is unacceptable, index data-spaces and data data-spaces can be committed to persistent storage.

The data structures described in relation to FIG. 3 support an on-line data-space reorganization tool. As previously addressed, however, the methods and techniques described, above, for efficiently relating large amounts of temporary information to data-elements in a data-space can be used to support a wide variety of applications, such as an on-line database image copy facility.

As described above, the present methods and techniques may be optimized to meet both the needs of an identified application as well as optimization constraints imposed by the operational environment.

Figure 4:
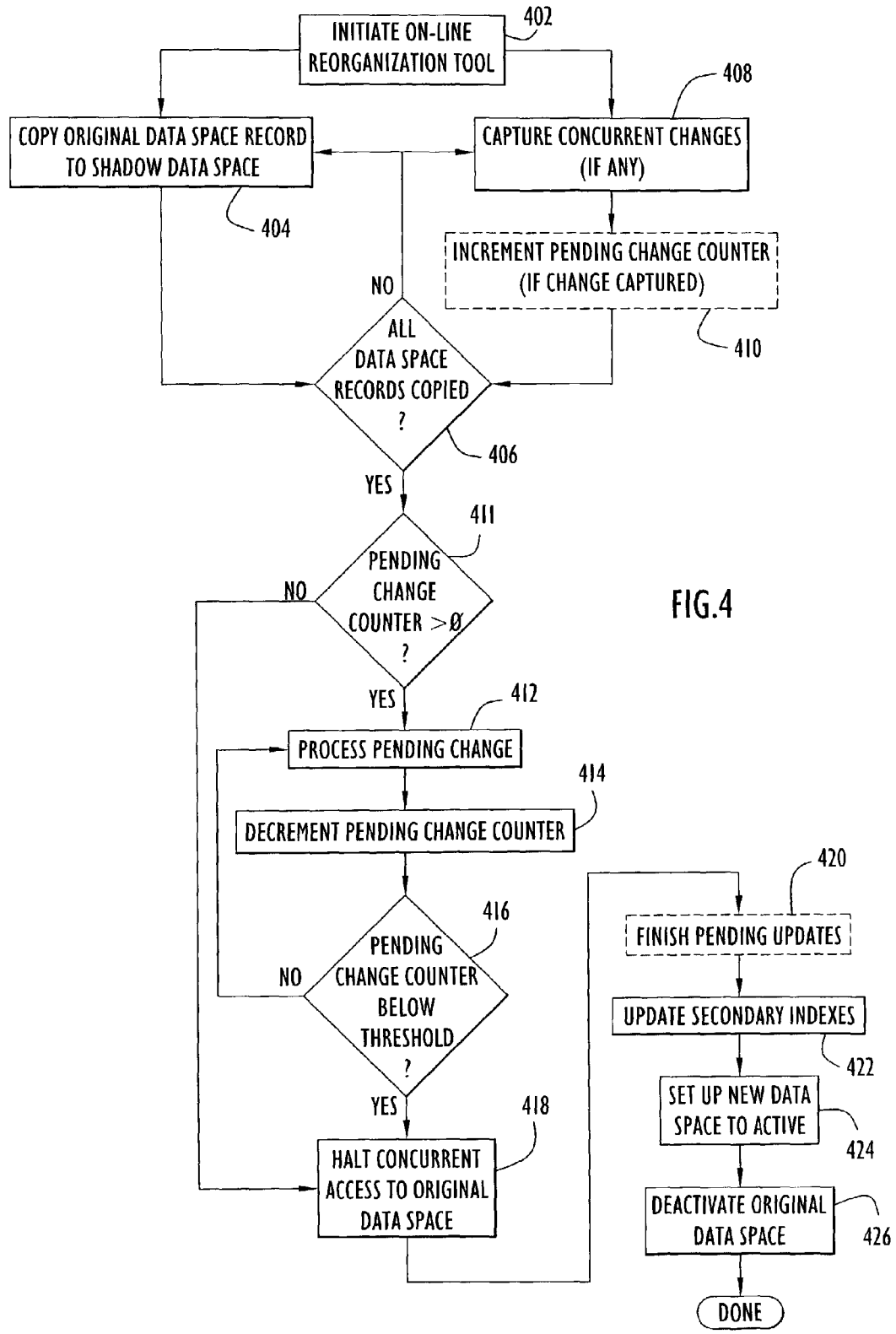
FIG. 4 is a flow chart illustrating a representative method for reorganizing a data-space and capturing and applying pending changes to the reorganized data-space.

FIG. 4 presents a non-limiting representative process flow, consistent with the ORF modules described in relation to FIG. 2, the data structures described in relation to FIGS. 2 and 3, and the described methods and techniques for reorganizing an on-line database.

The on-line reorganization facility is initiated 402 upon receipt by the initialization module (FIG. 2, 202) of a request to reorganize an identified database. The request can be received via numerous interfaces including a user initiated command or a request from another administrative module. The initialization module initiates an instance of a management module (FIG. 2, 204), and passes to the management module the name of the database, to be reorganized. As previously described, the management module coordinates the activities of the other ORF modules shown in FIG. 2, throughout the reorganization process.

After initiation, the reorganization process, proceeds with two sub-processes executing in parallel. The first sub-process, 404, focuses on copying data-elements from the original data-space to the reorganized shadow data-space, as previously described. During this process one data record at a time is locked, thereby prohibiting other users from modifying any segments in the record while the reorganization utility holds the lock. Upon copying/reorganizing all data-elements associated with a record, the lock is released. In this manner, the database may remain accessible throughout the reorganization process for only a small number of records are locked at any one time.

During the process of copying and reorganizing data-elements, performed via sub-process 404, as described above, unlocked records in the original data-space remain on-line and the data-elements contained within those unlocked records remain available to processes external to the ORF processes. Depending upon the nature of the external process, such on-line availability can result in additions, deletions, and/or modification, to information contained within data-elements of the original data-space. Although such availability may be beneficial from an operational perspective, allowing the original data-space to remain on-line creates a likelihood that changes may be applied to a data-element within the original data-space after that same data-element has been copied to the shadow data-space.

While sub-process 404 proceeds to copy and reorganize data-elements to the shadow data-space, the second sub-process 408 monitors log requests and captures changes to data-elements in the original data-space, as described in relation to the discussion of FIG. 3. A pending change counter is incremented 410 the first time an element in the data data-space is updated to reflect a change to its corresponding element in the original data-space, as previously described. Box 410, in FIG. 4, is shown in dashed lines to illustrate that the pending change counter is not updated every time a change is capture, but only the first time each element in the data data-space is updated. In this manner, the pending change count reflects the number of shadow data-elements in the shadow data-space that must be updated in order to eliminate inconsistencies between the original and shadow data-spaces.

The reorganization module (FIG. 2, 212) determines, in operation 406, if all data-elements contained within the original data-space have been successfully copied to the shadow data-space 404. If not, processing continues with concurrent processes 404 and 408, as described above. If so, the reorganization module informs the management module that the reorganization/copy process is complete 406 and processing continues at box 411. If the pending change counter is greater than zero 411, the management module initiates the pending change module (FIG. 2, 208) to process and apply pending changes 412 tracked in the data data-elements of the data data-space.

The pending change module communicates with the utility services module (FIG. 2, 216) to retrieve data-elements that indicate changes, deletions and/or additions to the original data-space and to apply the pending changes as described in relation to the discussion of FIG. 3. Each time a discrepancy between the original data-space and the shadow data-space is resolved, the pending change counter is decremented by one 414. When the pending change counter reaches a user configurable threshold 416, the management module stops on-line activity 418 to the original data-space, so that the remaining pending changes can be applied 420 (i.e., change processing continues until the pending change counter is decremented to zero) resulting in a reorganized shadow data-space that is entirely consistent with the original data-space. Box 420, in FIG. 4, is shown in dashed lines to illustrate that if there are no pending updates, processing continues at box 422. Next, secondary indexes within the database environment are updated 422 to point to the shadow data-space, thereby making the shadow data-space the active data-space 424 (i.e., replacing the original data-space), and making the original data-space a deactivated data-space 426. The reorganization process is then complete.

Having described apparatuses, articles of manufacture and methods of capturing data changes utilizing data-space tracking, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

TRADEMARKS

IBM is a trademark or registered trademark of International Business Machines, Corporation in the United States and other countries.

DB2 is a trademark or registered trademark of International Business Machines, Corporation in the United States and other countries.

What is claimed is:

1. A method of reorganizing a database and concurrently providing access to the database for updates, the database including an original data-space having a plurality of original data-elements and a shadow data-space having a plurality of shadow data-elements, the method comprising:

copying contents of an original data-element within the original data-space to a shadow data-element within the shadow data-space;

reorganizing the shadow data-space;

keeping track of a location of an original data-element that is changed after the contents of the original data-element are copied to the shadow data-element; and copying data from the location of the changed original data-element to a location of a shadow data-element in the reorganized shadow data-space corresponding to the changed original data-element, wherein said keeping track of a location of an original data-element that is changed, comprises: intercepting a log request that indicates a change to the original data-element; recording in a data data-element in a data data-space information indicating that the original data-element changed; and recording a location of the data data-element in an index data-element of an index data-space, wherein a location of the index data-element within the index data-space corresponds to the location of the original data-element within the original data-space.

2. The method of claim 1, wherein the information recorded in the data data-element in the data data-space includes a type of change that occurred.

3. The method of claim 2, wherein the type of change recorded is at least one of an addition, an update, and a deletion.

4. The method of claim 1, wherein the information indicating that the original data-element changed is recorded in non-persistent storage.

5. The method of claim 1, wherein the information indicating that the original data-element changed is recorded in persistent storage.

6. The method of claim 1, wherein said recording information indicating that the original data-element changed includes recording a position of the original data-element within the original data-space.

7. The method of claim 6, wherein the recorded position of the original data-element includes an offset of the original data-element from a base-address of the original data-space.

8. A computer program embodied on a computer readable medium for reorganizing a database and concurrently providing access to the database for updates, the database including an original data-space having a plurality of original data-elements, a shadow data-space having a plurality of shadow data-elements, a data data-space having a plurality of data data-elements and an index data-space having a plurality of index data-elements, the method comprising:

program instructions for copying contents of an original data-element within the original data-space to a shadow data-element within the shadow data-space and associating the original data-element and shadow data-element using a data data-element;

program instructions for reorganizing the shadow data-space;

program instructions for keeping track of a location of an original data-element that is changed after the contents of the original data-element are copied to the shadow data-element by using the data data-element that is located using an index data-element; and program instructions for copying data from the location of the changed original data-element to a location of a shadow data-element in the reorganized shadow data-space corresponding to the changed original data-element, wherein said program instructions for keeping track of a location of an original data-element that is changed, comprises: program instructions for intercepting a log request that indicates a change to the original data-element; program instructions for recording information in the data data-element in the data data-space indicating that the original data-element changed; and program instructions for recording a location of the data data-element in the index data-element of the index data-space, wherein a location of the index data-element within the index data-space corresponds to the location of the original data-element within the original data-space.

9. The computer program of claim 8, wherein the information recorded in the data data-element in the data data-space includes a type of change that occurred.

10. The computer program of claim 9, wherein the type of change recorded is at least one of an addition, an update, and a deletion.

11. The computer program of claim 8, wherein the information indicating that the original data-element changed is recorded in non-persistent storage.

12. The computer program of claim 8, wherein the information indicating that the original data-element changed is recorded in persistent storage.

13. The computer program of claim 8, wherein said program instructions for recording information indicating that the original data-element changed includes recording a position of the original data-element within the original data-space.

14. The computer program of claim 13, wherein the recorded position of the original data-element includes an offset of the original data-element from a base-address of the original data-space.

* * * * *